United States Patent [19]

Dickinson

[11] Patent Number: 5,000,099
[45] Date of Patent: Mar. 19, 1991

[54] COMBINATION OF FUELS CONVERSION AND PRESSURIZED WET COMBUSTION

[75] Inventor: Norman L. Dickinson, Monte Sereno, Calif.

[73] Assignee: Dipac Associates, Monte Sereno, Calif.

[21] Appl. No.: 290,368

[22] Filed: Dec. 29, 1988

Related U.S. Application Data

[63] Continuation-in-part of Ser. No. 100,531, Sep. 24, 1987, abandoned, which is a continuation-in-part of Ser. No. 813,486, Dec. 26, 1985, Pat. No. 4,714,032.

[51] Int. Cl.$^5$ .............................................. F23G 7/04
[52] U.S. Cl. ..................................... 110/238; 110/346
[58] Field of Search ............... 110/215, 261, 238, 343, 110/344, 235, 216, 218, 219, 222, 260, 262, 342, 345, 346, 347, 348; 122/7 R, 7 C; 431/4

[56] References Cited

U.S. PATENT DOCUMENTS

| | | | |
|---|---|---|---|
| 3,858,534 | 1/1975 | Berg | 110/234 |
| 3,859,933 | 1/1975 | Von Klenck | 110/219 X |
| 3,996,862 | 12/1976 | Besik et al. | 110/238 X |
| 3,996,864 | 12/1976 | Besik et al. | 110/219 X |
| 4,262,610 | 4/1981 | Hein et al. | 110/218 X |
| 4,291,539 | 9/1981 | Potter | 110/229 X |
| 4,380,960 | 4/1983 | Dickinson | 110/238 X |
| 4,437,417 | 3/1984 | Roberts | 110/238 |
| 4,473,469 | 9/1984 | Bose et al. | 110/216 X |
| 4,599,953 | 7/1986 | Gould | 110/234 |
| 4,714,032 | 12/1987 | Dickinson | 110/238 X |

Primary Examiner—Harry B. Tanner

[57] ABSTRACT

A fuels conversion which consumes energy and produces an aqueous waste is combined with a pressurized wet combustion which charges the waste, converting its combustible contaminants to energy returned to the conversion, concurrently purifying the waste for use or disposal. The heating value of the contaminants may be supplemented by an extraneous fuel, using the waste as slurrying medium, so that the combination is made energy self-sufficient. Transfer of heat may be by direct contact between hot combustion products and fuel being converted. Other processes which produce aqueous waste and consume energy may similarly be combined with the wet combustion.

22 Claims, 3 Drawing Sheets

COMBINATION OF FUELS CONVERSION AND PRESSURIZED WET COMBUSTION

CROSS-REFERENCE TO RELATED APPLICATIONS

This application is a continuation-in-part of co-pending application Ser. No. 100,531, filed Sept. 24, 1987, abandoned (parent case), which is itself a continuation-in-part of application Ser. No. 813,486, filed Dec. 26, 1985 (now U.S. Pat. No. 4,714,032), and is cross-referenced to my U.S. Pat. Nos. 4,377,066 (A) and 4,380,960 (B). application Ser. No. 294,424 (now U.S. Pat. No. 4,898,107) is also a continuation-in-part of application Ser. No. 100,531.

BACKGROUND OF THE INVENTION

Emissions of sulfur oxides from the combustion of sulfur-containing coals is generally considered one of the main causes of the "acid rain" which is damaging lakes, streams and forests, particularly in Northeastern states, and straining relations with Canada. Although these oxides, commonly referred to as SOx, can be scrubbed from the stack gases of utility and industrial boilers, the process is expensive and incomplete. A leading alternative is to substitute for high and medium sulfur coal a solid fuel naturally low in sulfur. Such substitution, however, places a premium price on these low sulfur grades and, conversely, depresses the price of higher sulfur grades, with serious economic consequences to areas dependent upon mining them.

While varying considerably from case to case, transportation from mine to point of use generally adds substantially to the cost of fuel. Although very conscious of the moisture in fuel they buy, the Electric Power Research Institute (EPRI) has reported that, in 1987, utilities spent $1.6 billion just for shipping water. The energy wasted in evaporating this water was equivalent to 10 million tons of bituminous coal.

Much of the country's reserves of low sulfur coal are located in Wyoming, Mont. and adjacent states, a considerable distance from major markets. They are, in general, high in moisture and low in heating value, adding to the expense of shipping energy to where it is needed. Accordingly, inventors and entrepeneurs have given considerable attention in recent years to conversion processes which drive off moisture and improve the heating value of the low sulfur coals and lignites found in these areas, so that their energy can be delivered more economically.

An example is the conversion described in U.S. Pat. No. 4,052,168 (Koppelman) for which a demonstration unit is under construction in Fort Union, Wyo., the solid fuel product being referred to as "K-Fuel". Another example is the "Charfuel" process, assigned to Carbon Fuels Corporation, whose energy product is a non-aqueous slurry of char in liquid products said to be transportable by pipeline. A charfuel demonstration unit will be cited at Glenrock, Wyo.

A common denominator of these conversions is that they produce a distillate by-product of water, heavily contaminated with complex organic compounds (waste water or aqueous waste), which is very expensive to treat, by known means, to the purity required for discharge into public watercourses. At the same time, most of these conversions are net consumers of energy, especially when taken together with the mines and other (off-site) facilities associated with them.

Similarly, other industrial conversions, including thermal and/or oxidative processing of shales, wood by-products and petroleum residues, result in the inadvertent production of aqueous wastes difficult to purify while, at the same time, consuming considerable heat, steam and/or electrical energy.

Primary treatment of dilute wastes of non-hazardous nature usually consists of settling, with or without the addition of floculating agents. Secondary treatment usually comprises bacterial digestion, aerobic or anaerobic. Following this "biological" treatment a concentrated sewage sludge is commonly separated for disposal. After secondary treatment the waste is usually considered suitable, sometimes after chlorination, for discharge into a nearby watercourse, the primary requirement being a low Biological or Chemical Oxygen Demand (B.O.D. or C.O.D.). To achieve a higher effluent standard, a tertiary treatment with activated carbon may be added. Some dilute industrial wastes may skip the biological step. Newer remediation technology accelerates aerobic digestion by substituting oxygen for air, and a type of molecular filtration utilizing porous membranes, known as "reverse osmosis" is achieving success with selected dilute wastes. In general, all of the foregoing treatments are practically limited to wastes having less than about 2 percent combustible organic content.

To dispose of more concentrated and hazardous wastes land-based disposal methods: ponding, landfill and deepwell injection, are commonly used. Landfills usually limit their acceptance of liquid waste to a small fraction of their main commodity, Municipal Solid Waste (MSW). Because of a growing shortage of suitably located land, and environmental opposition, incineration (burning) of solid and concentrated wastes at atmospheric pressure is increasingly preferred.

If the combustible content is less than about 30 percent, supplemental fuel must be fired to achieve stable combustion and a high enough temperature to destroy stable toxic ingredients or intermediates. Above about 30-35 percent combustibles, the combustion yields recoverable energy. Primarily because of a critical shortage of suitable landfills in many areas, such "waste-to energy" boilers are being installed at a rapid rate. Since the latent heat of all of the water in the fuel is lost up the stack they are thermally inefficient.

Waste-fueled boilers, moreover, create environmental problems of their own. There is a rising tide of opposition from nearby residents who fear that atmospheric emission regulations (at present limited to particulate matter) and standards of operation do not adequately protect their health. At least 26 toxic pollutants have been identified in incinerator flue gas. Moreover, the unburned residue may contain hazardous substances and, itself, be difficult to dispose safely.

The EPA plans to publish a list of incinerator air pollutants by November 1988 and propose New Source Performance Standards a year later, a regulatory effort which does not satisfy environmentalists nor congress. Congress, however, was unable to pass in 1988 either the Clean Air Act Amendment or the Resources Conservation and Recovery Act (RCRA). The impasse reflects, at least in part, the difficulty and expense of removing the pollutants from the large volume of flue gas, characteristic of atmospheric pressure combustion.

Combustible content of waste water from fuels conversion is often in the range of 2–15 percent, above the practical range for the usual dilute waste treatment (such as carbon adsorption and reverse osmosis) but below a concentration capable of supporting atmospheric combustion (incineration). In other words, they can be incinerated only at extravagant expense for auxiliary fuel.

Innumerable commercial, industrial and chemical operations, and even solid waste treatments, produce a by-product of aqueous waste. Many of these wastes can be treated economically by conventional methods. Others, particularly those having a combustible content in excess of about 2 percent, are currently treated only with difficulty and excessive expense.

Patent and technical literature describe two additional methods of purifying aqueous wastes by burning combustible impurities from them. Both employ elevated pressures as well as temperatures. The older of these methods, known as Wet Air Oxidation (WAO), is licensed by Zimpro, Inc. For the most part, it is public domain. The second, known as Supercritical Water Oxidation (SCWO), based on U.S. Pat. No. 4,543,190 (Modell et al), is licensed by Modar, Inc. They are more thermally efficient than incineration because the purified water is discharged in liquid state, conserving its latent heat. Also, the flue gas is ordinarily free of pollutants and requires little or no treatment.

WAO oxidizes combustible impurities from aqueous wastes, imposing sufficient pressure to maintain them in liquid phase at temperatures which generally range from 400–650 degrees. SCWO oxidizes the impurities at temperatures and pressures above water's critical of 705.4 degrees and 3200 psi. While both methods are effective, they require expensive equipment, suitable for pressures generally in the range of 2000–4000 psi.

SUMMARY OF THE INVENTION

I have discovered that combustible impurities in aqueous waste may be effectively and efficiently destroyed by combustion (oxidation) at elevated pressures and supercritical temperatures (above 705.4 degrees F) and that, by charging supplemental fuel along with the aqueous waste, a combination of a fuels conversion process and its waste remediation process may be efficient and energy self-sufficient. While the combustion pressure may be supercritical, it is advantageous, in many embodiments, for it to be subcritical.

The distinguishing feature which allows these combustions to be combined effectively with fuels conversions is that they recover the latent heat of the large excess of water present in their wastes; hence the dry heating value is realized, a useful credit. With atmospheric combustions (incinerations, Waste-to-Energy boilers) heat consumed to evaporate the water usually exceeds the dry heating value; hence their net heating value is negative, a costly debit. Consequently, the subject combination is considerably more fuel efficient than the aggregate of conversion and atmospheric combustion.

At or near the site of an energy-consuming fuels conversion installation, having a by-product of contaminated aqueous waste, complimentary apparatus is installed to practice a pressurized wet combustion in accordance with the teachings of the parent case, application Ser. No. 813,486 (U.S. Pat. No. 4,714,032) and/or referenced patents A and B. The aqueous waste can serve as a liquid vehicle in which to slurry and charge fuel to the combustion, providing at the same time a water vapor concentration which favorably influences combustion chemistry. Additional aqueous waste may be injected into the combustion to control its temperature at the desired level. Combustible contaminants in the aqueous waste burn along with the fuel, supplementing its heating value. If the aqueous waste contains non-combustible constituents, they combine and are discharged with ash from the fuel. Heat or steam (and/or electricity derived therefrom), produced by the combustion, serve to supply part or all of the energy requirements of the conversion and its associated facilities (fuels conversion complex).

Unless delivered as a slurry, carbonaceous fuel is ground or pulverized and mixed with aqueous waste and/or aqueous recycle to form an aqueous slurry. The alkali content of the slurry is adjusted to a level in excess of the chemical equivalent of sulfur in the combined charge as alkali sulfate, and sufficient to maintain a neutral or alkaline pH in downstream equipment. Generally, ground limestone or dolomite is the most economical alkali for the purpose. The slurry is pumped, preheated and charged, along with combustion air (or other oxygen-containing gas), to a pressurized combustion zone maintained at a temperature above the critical temperature of water, the preferred range for boiler embodiments being 1200–1500 degrees, and for gas turbine embodiments 1500–2400 degrees.

Since fuel slurry water vaporizes with the absorption of considerable heat, means of establishing an adequately high inlet zone temperature are essential. With a bubbling type of fluidized bed, the heat content of the turbulent bed solids is capable of providing the necessary heat. With a circulating fluidized bed, the heat content of circulated solids performs this function. With an entrained (dispersed) phase combustor it is possible to achieve this end by recycling hot combustion products, with or without a primary separation of solid products.

To limit combustion temperature to a predetermined maximum, the excess net heat of combustion may be extracted through heat transfer surface in the combustion zone, or absorbed by latent heat of additional aqueous waste or recycled water, or by a combination of both methods. The latter method maximizes the consumption of aqueous waste, relative to supplemental fuel.

Effluent from the combustion zone discharges into a solids separating device. Separated solid products may be discharged from the apparatus as products of the process (although, in circulating fluidized bed embodiments, some is recycled to the inlet zone).

Solid products may be withdrawn from the pressurized apparatus by means of a plurality of lock hoppers, according to known art. A preferred method comprises mixing the pressurized solids with aqueous condensate (or fines slurry) from downstream portions of the apparatus, which displaces gases accompanying the dry solids so that the gases may remain in the pressurized apparatus, before depressurizing the resulting ash slurry.

Useful heat is recovered from the hot gaseous products leaving the solids separator. Higher level heat may be transferred for such purposes as reheating flue gas or flue gas-steam mixture, generating and superheating steam and, in some cases, preheating combustion air. Moreover, a special merit of the subject combination is the possibility of transferring heat to the associated conversion by direct contact between hot gaseous combustion products and the materials in process of conversion.

In the latter stages of heat recovery the dewpoint is reached and liquid water condenses from combustion products. Fine solid particles (fines), unseparated by the solids separator, are wetted and transferred to the aqueous phase.

Some of the fines slurry may be recycled to the combustion zone. The net production, if of sufficient quantity, may be subjected to heat recovery, as to preheat fuel slurry or, alternatively, mixed with net solids withdrawn from the reactor and/or ash separator, before heat recovery. In either case, the cooled slurry is depressured and subjected to conventional methods of disposal. After separation of solids, some of the aqueous component may be re-used as fuel slurry water.

In gas turbine embodiments, only sufficient steam is condensed from combustion products to thoroughly remove fine particulates, after which the remaining gas-steam mixture is reheated by exchange with hot gaseous products and expanded through turbines which produce power in excess of that needed to drive the air compressors, the excess being converted to electricity. Heat remaining in turbine exhaust is recovered by generating steam.

In boiler embodiments, gaseous products are further cooled and dried by indirect exchange, as by dehydrated flue gas, boiler feedwater or aqueous waste destined for reactor temperature control, and/or by counter-current contact with circulating water. Heat so transferred to the water may be utilized for similar purposes. In the base boiler case, dehydrated flue gas is reheated only to a temperature such that the turbines are able to power the air compressors. Alternatively, it may be reheated (at the expense of steam production) to a higher temperature such that the turbine yield excess power, convertible into electricity. Water condensed from the gaseous products is distillation-purified and may be withdrawn and utilized for any purpose requiring water of good quality.

Energy produced by the pressurized combustion may be transferred to the fuels conversion and/or associated facilities as superheated and/or saturated steam, electricity or, alternatively or additionally, some of the combustion heat may be transferred by direct heat transfer between hot combustion gases and fuels being converted.

Because of their widespread occurrence and significance to the nation's fuel economy, coals and coal slurries represent important fuels which benefit from the practice of my invention, particularly those with high contents of moisture, ash and sulfur. However, its practice embraces the conversion of all forms of carbonaceous materials including, but not limited to, petroleum coke, char, lignite, peat, forestry and agricultural by-products, municipal waste (or Refuse Derived Fuel) and fuels of vegetable or organic origin known collectively as "biomass".

An object of the invention is to provide an improved means of obtaining heat and power from coal and other carbonaceous fuels, with a minimum of air and water pollution. Another object is to improve the economics of utilizing fuels and wastes with low heating value and/or high contents of sulfur, ash and/or moisture. A further object is to provide the fuels user increased flexibility toward alternative sources. A further object is to provide an improved means of treating aqueous wastes to acceptable standards of Chemical Oxygen Demand. A further object is to provide an improved means of purifying contaminated aqueous wastes concurrently with supplying heat and/or power. A related object is to provide an improved means of recovering the heating value of fuels delivered by slurry pipeline. Additional objects will be apparent from a consideration of the drawings and explanations thereof.

DESCRIPTION OF PREFERRED EMBODIMENTS

Figure 1:
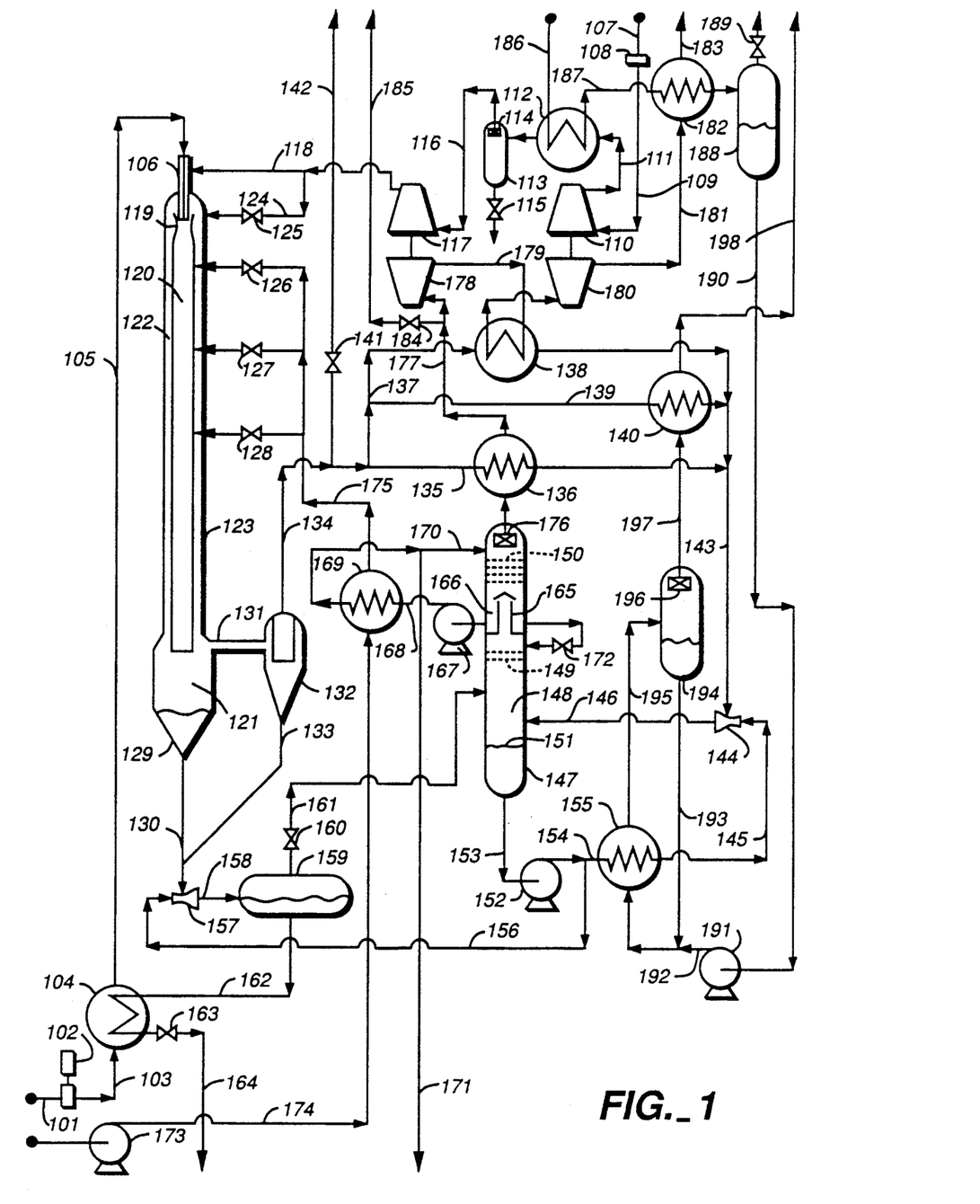
FIG. 1 is a schematic elevational diagram of a water injection boiler embodiment of the invention of the referenced cases suitable for innovative combination with an energy-consuming fuels conversion complex producing a contaminated aqueous waste.

With reference to FIG. 1, a preprepared alkalized aqueous slurry of solid fuel is supplied from a suitable storage facility through a line 101 to a fuel slurry charge pump 102, which provides sufficient pressure to cause it to flow through a line 103, a slurry preheat exchanger 104 and a line 105 to an air-slurry mixer 106. The slurrying medium for the solid fuel which frequently would be the same or similar to that charged to the conversion is preferably an aqueous waste from an associated fuels conversion.

Atmospheric air is drawn through a conduit 107 and a conventional filter 108 (to protect the apparatus from airborne solids) via a conduit 109 to the suction of a first stage air compressor 110, which delivers it hot and at an elevated pressure through a line 111 to an intercooler 112, in which it is cooled by indirect exchange with boiler feedwater.

Atmospheric air contains a variable amount of water vapor (humidity). Most of the water vapor contained in the air drawn into the apparatus condenses to liquid water in the intercooler 112 and is discharged with the cooled air into a second stage compressor suction drum 113 equipped with a mist extractor 114, which serve to separate the water from the compressed air so that it may be discharged through the valve 115. (A direct contact intercooler can be used in place of the indirect intercooler 112, or the partially compressed air can be cooled by the evaporation of injected condensate.)

From the mist extractor 114 the cooled partially compressed air flows via a line 116 to the suction of a second stage air compressor 117 which delivers it hot and at a further increased pressure through a line 118 to the air-fuel slurry mixer 106.

(Although FIG. 1 illustrates an embodiment with two stages of compression, other embodiments may utilize three or more stages, with appropriate intercooling between stages.)

Fuel slurry and air are mixed in, and/or immediately after leaving, the mixer 106 and discharge at comparatively high velocity, through the throat of a venturi 119, into an elongated reaction tube 120. According to Bernoulli's well-known theorem, the mass velocity of fuel slurry and air creates a zone of reduced pressure in the venturi 119 which draws hot combustion products from a disengaging zone 121, through an annular passage 122, to mix with the discharge from the mixer 106, under the turbulent conditions existing immediately downstream. The heat content of recycled combustion products vaporizes the fuel slurry water and raises the temperature of the resulting air-steam-solids mixture so that combustion reactions are initiated.

(Although the venturi 119 serves to illustrate the principle employed to establish circulation of combustion products, in practice the mixer 106 may occupy a sufficient proportion of the cross-sectional area of the tube 120 to induce an adequate recirculation without narrowing its upper extremity into a defined venturi.)

Forming the outer wall of the concentric recycle passage 122, and containing the pressure of the reaction system, is a steel reactor shell 123, protected by an insulating refractory lining (not shown) as is the shell enclosing the zone 121.

Air supplied to the mixer 106 may be divided between primary and secondary passages which may contain swirl baffles and/or other mixing and dispersion means known to the arts of mixer, burner and/or spray drier design. The mixer 106 may also be equipped with injection or atomizing devices for auxiliary gas or liquid fuel, and an ignition device (not shown), useful or necessary for heating up the reaction system from a cold start.

Secondary (or tertiary) air may also be supplied from the line 118 through the line 124, under control of a valve 125, via the combustion products recycle in the passage 122.

As the air-steam-solids mixture flows downward in the tube 120, under turbulent conditions, fuel particles react with oxygen to release heat of combustion, causing the temperature to rise. This temperature is controlled below a predetermined maximum by the injection of preheated water, or preferably aqueous waste, through the valves 126, 127 and/or 128. The number and location of injection points is diagramatic. In practice more, or fewer, points may be specified. Although mixing devices can be used, they are not normally required because of the turbulence in the tube 120.

During the time provided in the tube 120, conversion to carbon dioxide and water of combustible material in the fuel, and slurry and injected waste, is essentially complete, the resulting combustion products being discharged into the disengaging zone 121. In the zone 121, the inertia of unburned soild particles, together with the force of gravity, causes most of the solid products to disengage from gaseous products and fall to the conical bottom section 129, from which they are withdrawn through the conduit 130. Although not shown, the conical section 129 may be equipped with aeration connections, through which air and/or steam may be injected to insure that the solids collected therein remain in free-flowing (fluidized) condition.

Gaseous products, still carrying unseparated solid particles, reverse direction and leave the top of the disengaging zone 121, part to be recycled through the annular passage 122 and the remainder (net production) leaving the reaction system through a line 131. Because of its content of entrained fine particles the net production may be subjected to a further gas-solids separation in a device 132 illustrated as, but not necessarily, a cyclone separator. Fine solids separated in the device 132 flow through a dipleg 133 to join with the solids leaving the disengaging zone 121 via the line 130.

Gaseous products, containing only fine solid particles unseparated by the device 132 (fines), leave the reaction system through a manifold 134. The manifold 134 supplies the hot gases as heating media, via a line 135 to a first stage flue gas reheat exchanger 136, via a line 137 to a second stage flue gas reheat exchanger 138 and via a line 139 to a steam superheat exchanger 140. Some of the hot gaseous products in the manifold 134 may also be diverted through a valve 141 and a line 142 to serve as a heating medium in an associated fuels conversion apparatus. In case there are more than two stages of expansion, an additional reheat exchanger, or exchangers, would be installed in parallel with the exchangers 136, 138 and 140.

Having been partially cooled in the exchangers 136, 138 and 140, undiverted gaseous products are recombined in a manifold 143 and flow to a vapor-liquid mixer 144, illustrated as but necessarily of, venturi type, in which they are intimately contacted with a recirculting stream of fines slurry from a line 145. The fines slurry quenches the partially cooled combustion products to a temperature below their dewpoint. Entrained fines are wetted and transferred to the aqueous phase.

The mixture of uncondensed gaseous products (containing considerable steam) and fines slurry flow through a line 146 to a fines separator and wash vessel 147, comprising a separating zone 148, entrainment removal trays 149 and a washing and condensing section 150 containing a plurality of vapor-liquid contacting elements. In the separating zone 148, fines slurry disengages from gaseous phase and collects in the bottom section, forming a fines slurry level 151.

A fines slurry pump 152 takes suction from the bottom of the vessel 147 through a line 153 and discharges the hot slurry through a line 154 to a slurry boiler 155 in which it is partially cooled by indirect heat transfer to boiling feedwater and then flows via the line 145 to the mixer 144. The boiler 155 is sized and/or operated so that the partially cooled slurry condenses from the combustion products only sufficient water to adequately remove fines and vaporized salts therefrom, and provide sufficient liquid medium to slurry the net production of solid products to be withdrawn from the pressurized portion of the apparatus.

The fines slurry level 151 is held within the proper operating range by withdrawing the net fines slurry production through a line 156 to an ash eductor 157 to which is also directed the production of ash and spent alkali from the line 130 and the dipleg 133. Either the line 130 or the dipleg 133, or both, may contain a fluidized solids control device (not shown).

The eductor 157 mixes the dilute fines slurry with the ash and spent alkali; which also carry with them gases which characteristically accompany fluidized solids. The heat content of the ash converts an appreciable portion of the slurry water to steam. The resulting gas-steam mixture flows with the combined slurry through a line 158 to an ash slurry deaeration drum 159. In the drum 159 gravity causes the gas and steam to disengage from the liquid slurry and form a continuous gaseous phase in the upper part, from which they are vented, under control of a vent valve 160 and via a line 161, to a suitable point in the heat recovery section of the apparatus, such as to the separating zone 148. The contained steam comprises an effective means of recovering useful heat from hot ash.

Ash slurry, from which gas bubbles have been largely disengaged, leaves the deaeration drum 159 via a line 162 and the fuel slurry preheat exchanger 104, indirectly transferring therein a major portion of its sensible heat to fuel slurry on its way to the air-slurry mixer 106. The level in the drum 159 is controlled, and proper pressure in the ash slurrying and cooling apparatus maintained, by a pressure reducing device 163, which discharges depressured, cooled ash slurry through a line 164 to suitable off-site disposal.

The wet flue gas separated from fines slurry in the zone 148 passes through one or more washing trays 149 to free it of slurry entrainment and then flows through a chimney 165 to the washing and condensing section 150. In the section 150 the wet flue gas, still containing considerable water vapor, is cooled by direct counter-current contact with cooled circulating condensate, much of its water vapor being condensed to liquid water.

Circulated and condensed condensate collect in a sump 166 in the lower part of the section 150 from which they are pumped by a condensate circulating pump 167 through a heat exchanger 169 in which heat is indirectly transferred to water or aqueous waste destined for reactor heat control. Cooled condensate is returned through a line 170 to the top contacting element of the section 150. The net production of condensate is withdrawn from the apparatus as a purified water product through a line 171.

A small amount of condensate from the sump 166 flows through a connection controlled by a valve 172 to the uppermost of the trays 149 in which it is utilized to insure that the wet flue gas is washed free of entrained slurry. After serving this purpose, the wash water and fines washed from the gas join the fines slurry in the bottom of the vessel 147.

Both the contact with cooled slurry in the mixer 144 and the washing of wet flue gas in the trays 149 result in condensing some of the steam in the gaseous phase. Wet scrubbing concurrent with condensation of steam is recognized as superior in particulate removal to scrubbing where condensation does not occur, particularly for submicron particles. Such an apparatus is sometimes referred to as a "condensing scrubber".

Water, generally of poor quality, or aqueous waste from an associated fuels conversion, is drawn from off-site storage, or preferably hot from the fuels conversion unit, by a pump 173 which gives it sufficient pressure to flow through a line 174, exchanger 169, line 175 and control valves 126, 127 and/or 128 to the reaction tube 120. Although not shown, a second indirect heat exchange may be performed between net condensate in the line 171 and incoming aqueous material in the line 174.

Cooled and partially dehydrated flue gas leaves the section 150 through a mist extractor 176 and is reheated by indirect exchange with hot combustion products in the reheat exchanger 136. (In some cases, the flue gas may first be partially reheated by indirect exchange with partially cooled combustion products by means of an exchanger, not shown, in the line 143). After reheating, the flue gas flows through a line 177 to be expanded in a first stage turbine 178 which delivers mechanical energy, in the form of shaft horsepower, to the second stage air compressor 117.

Some of the flue gas in the line 177 may be diverted through a valve 184 and a line 185 to serve as a heating medium in the associated fuels conversion apparatus.

Having been cooled by giving up energy in the turbine 178, the partially expanded flue gas flows via a line 179 to be indirectly reheated by hot gaseous products in the exchanger 138. The reheated flue gas is then delivered to be expanded a second time through a second stage flue gas turbine 180 which delivers mechanical energy, in the form of shaft horsepower, to the first stage air compressor 110.

Having been partly cooled by giving up energy in the turbine 180, the fully expanded flue gas, now at a pressure only slightly above atmospheric, flows via a conduit 181 to an economizer exchanger 182 in which part of its remaining sensible heat is indirectly transferred to boiler feedwater. The fully cooled flue gas is then discharged to the atmosphere through a conduit 183. In some cases, the exchanger 182 may not be economically justified and therefore omitted.

Boiler feedwater is supplied through a line 186, under pressure from an off-site pump, to serve as cooling medium in the intercooler 112. Indirect transfer of heat from hot compressed air in the intercooler 112 raises the temperature of the feedwater which is conducted through a line 187 to the economizer exchanger 182 in which (if installed) it is further heated by indirect exchange with flue gas exhausted from the turbine 180. The preheated feedwater then flows to a feedwater accumulator 188. In the accumulator 188 (which may be a "deaerator" of proprietary design) formerly dissolved gases, liberated by the heating, may be separated and vented through a valve 189.

A boiler feedwater pump 191 takes suction, through a line 190, from the lower part of the accumulator 188 and provides sufficient pressure to cause the preheated feedwater to flow via a line 192 to a point of junction with feedwater recirculated from a steam drum 194 via a line 193. The combined feedwater flows to the cold side of the slurry boiler 155 in which it is partially vaporized by indirect transfer of heat from hot fines slurry. The resulting steam-water mixture flows via a line 195 to the drum 194.

(In some cases the feedwater charged by the pump 191 may be further heated by a feedwater preheat exchanger (not shown) in the line 168, supplementing the circulating condensate cooling duty of the exchanger 169.)

In the drum 194 steam is separated from water and leaves through a mist extractor 196, which purifies it of entrained droplets on its way via a line 197 to the steam superheat exchanger 140, in which it is superheated by indirect transfer from hot gaseous combustion products before leaving the apparatus through a line 198 for utilization in other sections of the fuels conversion complex.

Dissolved solids brought into the apparatus with the cold feedwater tend to accumulate in the water in the drum 194 and have to be purged from the system through a blowdown connection (not shown). Blowdown water is suitable for fuel slurry preparation or injection unto the reactor.

If there is a strong advantage to producing ash dry instead of wet, it may be directed, instead of to the eductor 157, to a conventional means of depressurizing pressurized solids, such as a plurality of lock hoppers. In such case the production of fines slurry would be drastically reduced by operating the boiler 155 so as to condense less slurry water.

Among the options available to designers and operators of apparatus for the practice of the invention is that of specifying a relatively high combustion temperature, at which the production of sulfur dioxide is satisfactory, but the production of nitrogen oxides is higher than desired or permitted. In such case, a compound known to be a scavenger of nitrogen oxides, such as ammonia or urea, may be injected at a suitable point in the heat recovery system, such as into the line 134.

Flue gas may be heated in the exchangers 136 and 138 to a temperature (typically about 750–800 degrees) such that the turbines 178 and 180 produce exactly as much power as required by the compresors 110 and 117. Alternatively, flue gas may be reheated to a temperature higher than required to balance turbine and compressor horsepowers. In such case, at least one of the turbines produces excess mechanical energy which can be transmitted to a generator(s) (not shown) which converts it into electricity, deliverable for use by the fuels conversion unit or associated facilities.

FIG. 1 represents an embodiment in which there is no heat transfer surface within the reactor and heat of combustion in excess of that required to reach the desired temperature is absorbed by vaporizing water injected into the reactor ("water injection embodiments"). Such embodiments have a relatively greater capacity to consume aqueous waste than "heat transfer embodiments". Nevertheless, the latter may also be combined with a fuels conversion.

FIG. 1 illustrates two stages of air compression, with intercooling between stages, and two stages of flue gas expansion, with reheating between stages. Such water injection embodiments may employ two to four stages of compression and usually, but not necessarily, the same number of stages of expansion. The foregoing range in number of stages is representative of conventional centrifugal and/or axial flow compressors, without internal cooling, which are limited in compression ratio by the temperature rise caused by heat of compression. Since these novel combustions are tolerant of water vapor it is entirely conceivable that compressors utilizing water injection to moderate the temperature rise will become available, so that fewer stages (machines) would be required.

The illustrated configuration is also representative of the industrial type of turbo-machinery. In the case of relatively high turbine inlet temperatures, yielding a surplus of shaft horsepower, it is possible to substitute one or more aircraft-derived gas turbine sets (preferably a model with a relatively high compression ratio), their combustion chambers being replaced by the FIG. 1 combustion and particulate removal steps.

Optimum arrangement of heat recovery apparatus may vary from case to case. For example, depending upon the relative amounts of aqueous waste and feedwater, and their respective temperatures, their cooling roles may be reversed, i.e., aqueous waste employed for cooling interstage air and feedwater for cooling and drying wet flue gas.

FIG. 1 illustrates the production of a single grade of steam (usually at relatively high pressure and superheated). If, on the other hand, a minor production of lower pressure steam is acceptable, the spread between combustion and primary steam pressures can be reduced and/or the loss of latent heat in flue gas decreased. A low pressure boiler, comparable to item 155, could be placed in the line 168, supplementing the cooling duty of the exchanger 169.

Figure 2:
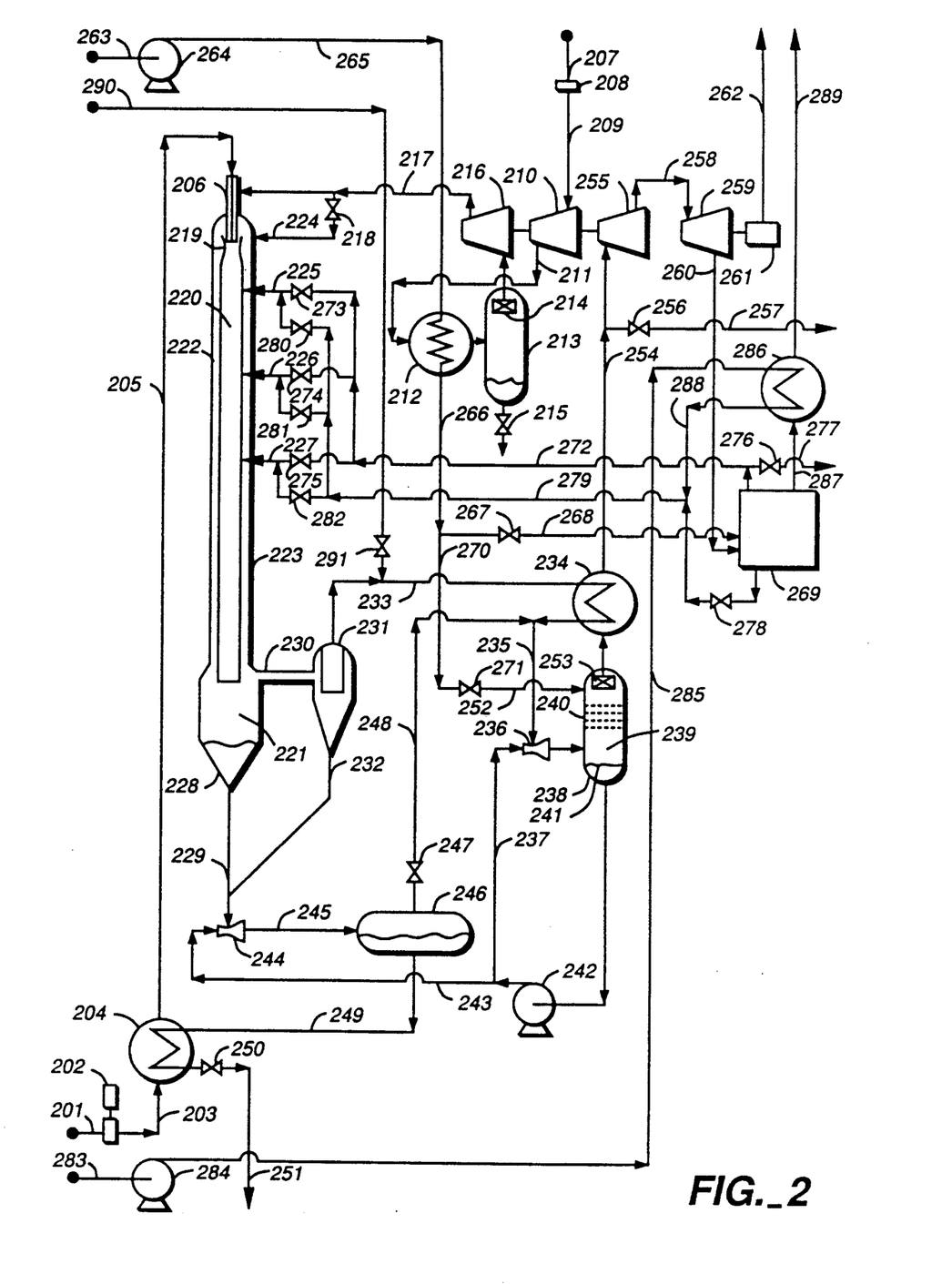
FIG. 2 is a schematic elevational diagram of a gas turbine embodiment capable of consuming the aqueous waste of a fuels conversion complex while supplying it with electrical energy and, optionally, superheated steam.

With reference to FIG. 2, a preprepared alkalized aqueous slurry of solid fuel is supplied from a suitable storage facility through a line 201 to a fuel slurry charge pump 202, which provides sufficient pressure to cause it to flow through a line 203, a slurry preheat exchanger 204 and a line 205 to an air-slurry mixer 206. The slurrying medium for the solid fuel, which frequently would be the same or similar to that charged to the conversion, is preferably an aqueous waste from an associated fuels conversion.

Atmospheric air is drawn through a conduit 207 and a conventional filter 208 (to protect the apparatus from airborne solids) via a conduit 209 to the suction of a first stage air compressor 210 of an aircraft-derived gas turbine set, which delivers it hot and at an elevated pressure through a line 211 to an intercooler 212, in which it is cooled by indirect exchange with boiler feedwater.

Atmospheric air contains a variable amount of water vapor (humidity). Most of the water vapor contained in the air drawn into the apparatus condenses to liquid water in the intercooler 212 and is discharged with the cooled air into a second stage compressor suction drum 213 equipped with a mist extractor 214, which serve to separate the water from the compressed air so that it may be discharged through the valve 215. (A direct contact intercooler can be used in place of the indirect intercooler 212, or the partially compressed air can be cooled by the evaporation of injected condensate.)

From the mist extractor 214 the cooled partially compressed air flows to the suction of a second stage air compressor 216 which delivers it hot and at a further increased pressure through a line 217 to the air-fuel slurry mixer 206.

Fuel slurry and air are mixed in, and/or immediately after leaving, the mixer 206 and discharge at comparatively high velocity, through the throat of a venturi 219, into an elongated reaction tube 220. According to Bernoulli's well-known theorem, the mass velocity of fuel slurry and air creates a zone of reduced pressure in the venturi 219 which draws hot combustion products from a disengaging zone 221, through an annular passage 222, to mix with the discharge from the mixer 206, under the turbulent conditions existing immediately downstream. The heat content of the recycled combustion products vaporizes the fuel slurry water and raises the temperature of the resulting air-steam-solids mixture so that combustion reactions are initiated.

(Although the venturi 219 serves to illustrate the principle employed to establish circulation of combustion products, in practice the mixer 206 may occupy a sufficient proportion of the cross-sectional area of the tube 220 to induce an adequate recirculation without narrowing its upper extremity into a defined venturi.)

Forming the outer wall of the concentric recycle passage 222, and containing the pressure of the reaction apparatus, is a steel reactor shell 223, protected by an insulating refractory lining (not shown) as is the shell enclosing the zone 221.

(The wall separating the reaction tube 220 from the annular passage 222 must withstand a high temperature environment and may, therefore, be constructed of suitable ceramic, cermet or composite material and/or, particularly if constructed of metal alloy, be equipped for cooling by air, steam or condensate. As a mechanically less difficult alternative, the narrow portion of the refractory-lined shell 223 may be constructed in the shape of a vertical U-tube, the recycle passage 222 being replaced by a short refractory-lined external connection between the top of the disengaging zone 221 and the venturi 219.)

Air supplied to the mixer 206 may be divided between primary and secondary passages which may contain swirl baffles and/or other mixing and dispersion means known to the arts of mixer, burner and/or spray drier design. The mixer 206 may also be equipped with injection or atomizing devices for auxiliary gas or liquid fuel, and an ignition device (not shown), useful or necessary for heating up the reaction system from a cold start.

Secondary (or tertiary) air may also be supplied from the line 217 via the combustion products recycle through a valve 218 and a connection 224.

As the air-steam-solids mixture flows downward in the tube 220, under turbulent conditions, fuel particles react with oxygen to release heat of combustion, causing the temperature to rise. This temperature is controlled below a predetermined maximum by the injection of preheated water, or preferably aqueous waste and/or steam through the connections 225, 226 and/or 227. The number and location of injection points is diagramatic. In practice separate connections may be provided for water and steam and more, or fewer, points specified. Although mixing devices can be used, they are not normally required because of the turbulence in the tube 220.

Gas turbine combustors conventionally operate with at least 100 percent excess air, and sometimes as much as 300 percent. Because temperature in my combustion is controlled by injection of water and/or steam, I prefer to carry out the combustion with only about 10–50 percent excess air, proportionately increasing the fuel energy which can be released, and recovered, by a given amount of compressed air.

During the time provided in the tube 220, conversion to carbon dioxide and water of combustible material in the fuel, and slurry and/or injected waste, is essentially complete, the resulting combustion products being discharged into the disengaging zone 221. In the zone 221, the inertia of unburned solid particles, together with the force of gravity, causes most of the solid products to disengage from gaseous products and fall to a conical bottom section 228, from which they are withdrawn through a conduit 229. Although not shown, the conical section 228 may be equipped with aeration connections, through which air and/or steam may be injected to insure that the solids collected therein remain in free-flowing (fluidized) condition. The quantity of fluidizing air and/or steam may be sufficient to cool the particles so as to minimize sticking or agglomerization.

Gaseous products, still carrying unseparated solid particles, reverse direction and leave the top of the disengaging zone 221, part to be recycled through the annular passage 222 and the remainder (net production) leaving the reaction system through a line 230. Because of its content of entrained fine particles it may be subjected to a further gas-solids separation in a device 231 illustrated as, but not necessarily, a cyclone separator. Fine solids separated in the device 231 flow through a dipleg 232 to join with the solids leaving the disengaging zone 221 in the conduit 229.

Gaseous products, containing only fine solid particles unseparated by the device 231 (fines), leave the reaction system through a line 233 which conducts them to a reheat exchanger 234. Some of the hot gaseous products in the line 233 may be diverted (through a line and valve not shown) to serve as a heating medium in an associated fuels conversion apparatus. In the exchanger 234 undiverted gaseous products are cooled to a temperature somewhat above their dewpoint by indirect transfer of heat to a washed gas-steam mixture.

The partially cooled combustion products then flow through a line 235 to a vapor-liquid mixer 236, illustrates as but necessarily of, venturi type, in which they are intimately contacted with a recirculating stream of hot fines slurry from a line 237. The fines slurry quenches the partially cooled combustion products to a temperature below their dewpoint. Entrained fines are wetted and transferred to the aqueous phase.

The mixture of uncondensed gaseous products (containing considerable steam) and fines slurry flow to a fines slurry separator 238, comprising a separating zone 239, and a plurality of entrainment washing elements or trays 240. In the separating zone 239, fines slurry disengages from gaseous phase and collects in the bottom section, forming a fines slurry level 241.

A fines slurry pump 242 takes suction from the bottom of the separator 238 and discharges the hot slurry through the line 237 to the mixer 236. In some cases it is necessary or desirable to cool the slurry in the line 237 by indirect exchange with aqueous waste or boiler feedwater, by means of a heat exchanger not shown.

The fines slurry level 241 is held within the proper operating range by withdrawing the net fines slurry production through a line 243 to an ash eductor 244 to which is also directed the production of ash and spent alkali from the line 229 and the dipleg 232. Either the line 229 or the dipleg 232, or both, may contain a fluidized solids control device (not shown).

The eductor 244 mixes the dilute fines slurry with the ash and spent alkali particles, which also carry with them gases which characteristically accompany fluidized solids. The heat content of the ash converts an appreciable portion of the slurry water to steam. The gas-steam mixture flows with the slurry through a line 245 to an ash slurry deaeration drum 246. In the drum 246 gravity causes the gas and steam to disengage from the liquid slurry and form a continuous gaseous phase in the upper part from which they are vented, under control of a vent valve 247 and via a line 248, to a suitable point in the heat recovery section of the apparatus, such as to the line 235. The contained steam comprises an effective means of recovering useful heat from the hot ash.

Ash slurry, from which gas bubbles have been largely disengaged, leaves the deaeration drum 246 via a line 249 and the fuel slurry preheat exchanger 204, indirectly transferring therein a major portion of its sensible heat to fuel slurry on its way to the air-slurry mixer 206. The level in the drum 246 is controlled, and proper pressure in the ash slurring and cooling apparatus maintained, by a pressure reducing device 250, which discharges depressured, cooled ash slurry through a line 251 to suitable off-site disposal.

The gas-steam mixture separated from fines slurry in the zone 239 passes through one or more cooling and washing elements or trays 240 to the uppermost of which is directed a flow of clean water through a line 252. The water flowing downward through the elements 240 washes any entrained slurry from the gas-steam mixture and, supplemented by condensation of a minor portion of the steam, supplies sufficient dilution to the fines slurry leaving via the line 243 to suitably slurry the production of ash and spent alkali in the eductor 244. Condensation of contained steam results in highly effective removal of particulates from the gas-steam mixture.

Washed gas-steam mixture leaves the separator 238 through an entrainment separator 253 on its way to the reheat exchanger 234 in which it is heated by indirect exchange to a temperature approaching that of hot combustion products in the line 233. The reheated gas-steam mixture flows through a line 254 to the inlet of a first stage turbine 255 of the gas turbine set. Some of the reheated mixture in the line 254 may be diverted through a valve 256 and a line 257 to serve as a direct contact heating medium in an associated fuels conversion.

In the turbine 255 the gas-steam mixture is expanded to a pressure which produces sufficient mechanical energy, in the form of shaft horsepower, to drive the first stage air compressor 210 and the second stage air compressor 216 to which it is coupled. Having been cooled by giving up energy in the turbine 255, the partially expanded gas-steam mixture flows through a crossover 258 to a second stage turbine 259 in which it is further expanded to a pressure only nominally above atmospheric into a conduit 260. Mechanical energy produced by the expansion in the turbine 259 is transmitted, in the form of shaft horsepower, to a generator 261 which converts it into electricity which is delivered from the apparatus through a conduit 262 to satisfy requirements in the associated fuels conversion complex.

Because the temperature to which the gas-steam mixture can be reheated may, in some cases, be limited by allowable stresses in heat transfer surface, it may be desirable to divide the reheat duty between the exchanger 234 and a second stage reheat exchanger (not shown) in the crossover 258, the two reheat exchangers being arranged in parallel with respect to combustion products in the line 233.

Boiler feedwater is brought into the apparatus through a line 263 and given sufficient pressure by a boiler feedwater pump 264 to cause it to flow through a line 265, the cold side of compressor intercooler 212, a line 266, a control valve 267 and a line 268 to the convection section of a Heat Recovery Steam Generator (HRSG) 269. The function of the HRSG 269, which may be a package-type unit available from one of several boiler manufacturers, comprising feedwater preheat, steam generation and superheating sections, is to recover sensible heat in the gas-steam mixture exhausted through the line 260.

The pump 264 is also shown to be supplying heated water to the line 252 and the washing elements 240 through a line 270 and a valve 271, although clean water (preferably heated) from any available source could be substituted.

Depending upon the energy balance of the combination of units and facilities at the site, steam generated in the HRSG 269 may be directed back to the combustion through a line 272 and the valves 273, 274 and/or 275 (which increases the production of electricity in the generator 261), or to other site facilities through a valve 276 and a line 277, or to a combination of both uses. For a given combustion temperature, steam injection decreases the requirement for injection of water or aqueous waste.

Feedwater at or near boiling point may also be withdrawn from the boiler drum of the HRSG 269 through a valve 278 and conducted via a line 279 to be injected for purposes of temperature control into the reaction tube 220 through the valves 280, 281 and/or 282. Withdrawal of water in this manner serves as boiler blowdown and, if of sufficient quantity, permits a relaxation of feedwater specifications.

Aqueous waste is preferably supplied hot from the associated fuels conversion through a line 283 and is given sufficient pressure by a pump 284 to cause it to flow through a line 285 to an economizer exchanger 286 in which it is heated by indirect exchange with gas-steam mixture exhausted from the HRSG 269 through a duct 287. Although illustrated as a separate exchanger, the economizer 286 is preferably comprised of a portion of the convection surface built into the HRSG 269.

The heated waste is discharged through a line 288 to serve as temperature control water in the reaction tube 220 as described in connection with feedwater withdrawn from the HRSG 269. This function would normally be served by waste water up to the amount available, with any additional cooling requirement satisfied by feedwater.

After final recovery of heat in the economizer 286, the gas-steam mixture is discharged to the atmosphere through a vent 289. To minimize the visible plume and/or recover valuable distilled water the discharge may be processed by known water recovery methods.

To maximize the production of electricity per unit of fuel burned it is necessary to employ a relatively high turbine inlet, and therefore combustion, temperature. Because of the alkali added to the fuel slurry and the pressure of the combustion, such combustion temperatures do not normally result in excessive emissions of sulfur oxides, but formation of nitrogen oxides, in spite of slurry dilution and staged introduction of air, may become higher than desired or permitted. In such case, this pollutant may be reduced by reaction with a scavenging agent, such as ammonia or urea, introduced (in a suitable carrier) through a line 290 and a control device 291. With combustion temperatures up to about 2000 degrees F., the agent may be injected into the line 233 as shown; with higher temperatures it is preferable to move the injection to an intermediate point in the hot side of the exchanger 234, where the temperature of combustion products is in the range of about 1600 to 2000 degrees.

If there is a strong advantage to producing ash dry instead of wet, it may be directed, instead of to the eductor 244, to conventional means of depressurizing pressurized solids, such as a plurality of lock hoppers. In such case the production of fines slurry would be curtailed by operating the separator 238 at an increased temperature.

Figure 3:
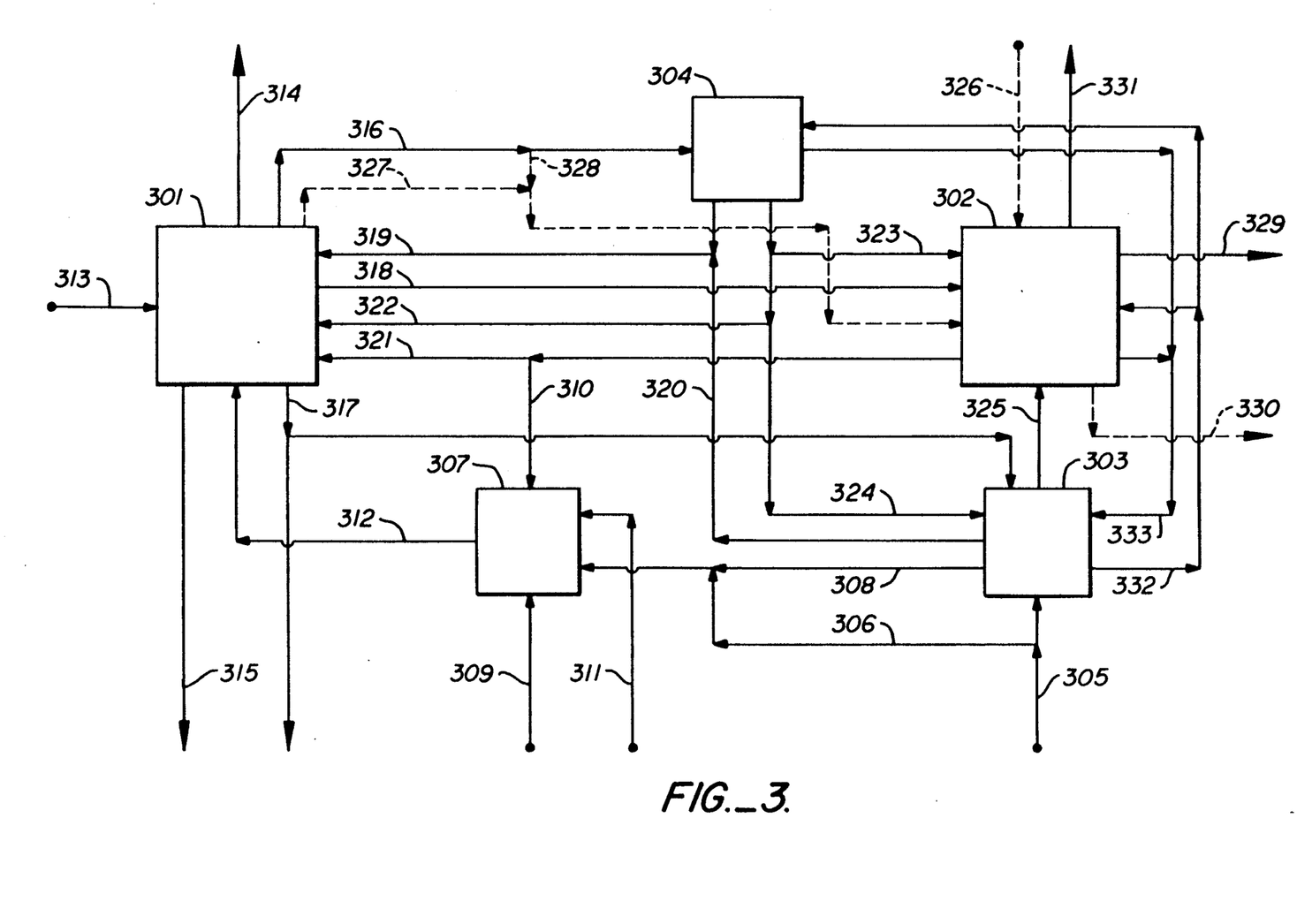
FIG. 3 is a schematic diagram of an innovative combination comprising a fuels conversion complex integrated with a pressurized wet combustion, such as diagrammed in FIGS. 1 and 2. and whose contaminated water by-product is purified while being utilized to slurry a solid fuel and to control combustion temperature.

With reference to FIG. 3, a combustion apparatus 301, operated in accordance with my inventions, receives aqueous waste from, and may directly supply heat and/or steam to, a thermal and/or oxidative fuel conversion or processing apparatus 302. The combustion apparatus 301 also supplies electrical energy to the processing apparatus 302 and offsite facilities 303, directly in the case of gas turbine embodiments, such as FIG. 2. Boiler embodiments, such as FIG. 1, produce steam which is converted to electricity by a condensing turbo-generator facility 304.

The combustion apparatus 301 may comprise an embodiment such as FIG. 1 or FIG. 2 of this application, FIG. 1 or FIG. 2 of the parent case, FIG. 1 or FIG. 5 of Patent A or FIGS. 1, 2 or 6 of Patent B, or may utilize features of more than one of them. Embodiments which rely largely or entirely upon water injection for reactor temperature control have greater capacity for purifying aqueous waste.

The fuel processing apparatus 302 may utilize any of the known or new processes of fuel conversion characterized by the production of a distillate aqueous waste containing appreciable amounts of combustible impurities. The conversion may be assisted by oxidation. It may also be a net consumer of thermal energy which can be satisfied by direct contact with hot flue gas or flue gas-steam mixture. Such apparatuses may conduct conversions of carbonaceous fuels into coke, char and/or fuel or synthesis gas, retort shale, process naturally occurring asphalts and bitumens or produce them from petroleum residues.

The offsite facilities 303 comprise whatever supporting and/or auxiliary facilities are needed to support the supply, operation and maintenance of the combustion apparatus 301 and the fuel processing apparatus 302. These may include, but are not limited to, offices, laboratories, shops, mines, quarries or the like, unloading, storing and preparing raw fuel, cooling water system, boiler feedwater treating, etc. Insofar as the direct operation of the apparatuses 301 and 302 is concerned, the pertinent functions of the offsite facilities 303 are the supply of fuel and cooling water, cooling and boiler feedwater make-up and consumption of electrical energy.

Raw fuel is supplied from a source 305 to the offsite facilities 303 in which the necessary storage and preparation are performed. Raw fuel may also be diverted through a transfer means 306 to a slurry preparation apparatus 307. Alternatively, fuel stored, or rejected during preparation, may be transferred to the slurry preparation apparatus 307 from the offsite facilities 303 via a transfer means 308.

In the slurry preparation apparatus 307, fuel from the transfer means 306 and/or 308 is ground and mixed with alkali from a conduit 309 and aqueous waste from a line 310 to form a fuel slurry. Additional water or aqueous waste, which may include boiler and cooling water blowdown, or from any other local source, may flow into the apparatus 307 through a line 311. Should raw fuel be mined hydraulically and/or delivered by slurry pipeline, the apparatus 307 would provide any necessary particle size and alkali adjustment.

Alkalized fuel slurry is pumped via a line 312 to the combustion apparatus 301 in which the fuel is burned as described in connection with FIGS. 1 or 2 and/or the referenced figures of the parent case, application Ser. No. 813,486 (U.S. Pat. No. 4,714,032) or Patents A and B. Air or oxygen to support the combustion is supplied through a conduit 313. The combustion results in the production of cooled flue gas, which is discharged to the atmosphere through a vent 314, wet or dry ash which is withdrawn through a conduit 315 and, in boiler embodiments, superheated steam which flows to the turbo-generator facility 304 through a line 316 and purified water which leaves by a line 317. It may also produce a stream of hot, pressurized flue gas or flue gas-steam mixture which is sent via a line 318, and/or saturated steam which is sent via a line 327, to the fuels processing apparatus 302.

Steam condensate may be returned from the facility 304 to the combustion apparatus 301 via a line 319 and may be supplemented, as required, by treated feedwater make-up from the offsite facilities 303 delivered by means of a line 320. Aqueous waste for injecting into the combustion reactor for temperature control may be supplied from the fuels processing apparatus 302 through a line 321, preferably hot as produced, without intermediate cooling or storage.

With boiler embodiments of apparatus 301, the product of the turbo-generator facility 304 is electricity which may be supplied to the combustion apparatus 301 through a conduit 322, to the fuel processing apparatus 302 through a conduit 323 and to the offsite facilities 303 through a conduit 324. With gas turbine embodiments, such as FIG. 2, which produce electricity directly, the normal load on the facility 304 is reduced or eliminated. Nevertheless, it may be retained for supplemental and/or standby capacity.

Prepared fuel is furnished to the fuel processing apparatus 302 by a transfer means 325. Atmospheric air or oxygen may be supplied to the apparatus 302 through a conduit 326. In some cases, saturated steam from the boiler drum of the combustion apparatus 301 may also be supplied to the apparatus 302 by means of the line 327. Alternatively, superheated steam to supply any process steam requirements of the apparatus 302 may be routed via a connection 328.

Gaseous, liquid or solid fuel product of the processing apparatus 302 is removed by a transfer means 329. In the case that the apparatus 302 produces an ash, spent shale or the like, it may be discharged by a transfer means 330. Should the apparatus 302 make use of a gaseous direct heating medium from the combustion apparatus 301, it may be discharged, after transferring its heat, through a line 331. In some cases, gases in the line 331 may have useful heating value and may be directed to an appropriate utilization.

Cooling water is supplied from the offsite facilities 303 as required by the fuels processing unit 302 and the turbo-generator facility 304 (if installed), through a manifold 332 and returned to the facilities 303 for cooling, treating and recirculation by means of a manifold 333. Although cooling water connections to the combustion apparatus 301 are not shown, they may be installed to supply minor services such as cooling pump glands, turbine supports, etc.

EXAMPLE

A Wyoming sub-bituminous coal, containing 30.2 percent moisture and having a heating value of 7,865 Btu/Lb., is charged to a fuels conversion process which has as its primary purpose increase of heating value, so as to conserve costs of shipping to point of consumption. ("Btu" stands for British Thermal Unit, a commonly used measurement of heat quantity.) The process yields 50.3 weight percent of converted fuel (char), having a heating value of 12,830 Btu/Lb. Thus, the "energy yield" in desired product is 80.4 percent. An additional 7 percent of the energy of the raw material goes to a fuel gas, which is burned to supply part of the heat consumed by the conversion.

The conversion inadvertently produces, as a distillate, a waste water comprising, not only the raw fuel moisture, but that produced from some of its previously bound hydrogen and oxygen. The amount is about 41 weight percent and it contains dissolved organic compounds corresponding to 5.4 percent of the energy of the raw coal. The concentration of combustible organics is about 11.5 percent. Because of the expense of incineration, or difficulty of treating this waste to acceptible standards in some alternative way, it is the plan to accumulate it in ponds in the hope that evaporation will eventually concentrate it to about 30 or 35 percent; it could then be burned. There are obvious risks to this plan, including the possibility of leakage from the ponds, the danger to migratory wildfowl, etc.

This waste water could be incinerated at the cost in premium fuel of approximately 76,000 Btu/Ton raw fuel, about 6.8 percent. If, on the other hand, it were processed according to this invention, approximately 55,000 Btu (about 4.9 percent) would be recovered for recycling to the conversion and/or its auxiliary equipment. Thus, compared with incineration, a total of 131,000 Btu/Ton, or 11.6 percent of the heating value of the raw fuel, would be saved. This is an advantage of about 4.5 million Btu/Ton of waste water. Moreover, supplemental fuel (which could be of unmarketable quality) could be charged with the waste water in an amount such that sufficient energy is produced to supply the needs of the entire complex.

DESCRIPTION OF THE INVENTION

The parent case, application Ser. No. 813,486 (now U.S. Pat. No. 4,714,032) and my U.S. Pat. Nos. 4,377,066 (A) and 4,380,960 (B) described methods of burning carbonaceous fuels under pressure in the presence of water vapor and alkali. Pressure, water vapor and alkali promote combustion so that essentially complete carbon conversion can be achieved with low excess air and at temperatures lower than normally employed. These conditions, including reduced temperature, combine to direct the chemistry of sulfur compounds in the fuel almost quantitatively to alkali sulfate, virtually eliminating sulfur dioxide from the flue gas. As is well known, reduction in temperature and staged introduction of air or oxygen also decrease the formation of nitrogen oxides so that both gaseous pollutants considered responsible for acid rain are effectively controlled.

Pressure also decreases the volume of gases to be processed and improves heat transfer coefficients, so that equipment is reduced in size and cost. It has the further desirable effect of increasing the dewpoint of combustion products and permitting recovery of latent heat at a useful temperature level. Condensation of water during heat recovery, on and around particles of ash and other solid products, wets them and effectively removes them from the flue gas. This action eliminates from the flue gas the third major pollutant, "particulates".

These combustions are "wet" in the sense that solid fuels are charged as aqueous slurries, and additional water may be injected into the combustion zone to control its temperature. Also, during heat recovery, water vapor in combustion products condenses to liquid water, permitting a thorough wet cleansing of the flue gas. In all embodiments, combustion temperature is predominantly or entirely above the critical temperature of water (705.4 degrees F.), hence supercritical with respect to temperature. Pressure, however, is not necessarily above water's critical pressure of about 3200 psi. When pressure is supercritical, water in the combustion zone is technically "dense phase" and the process may be termed "Supercritical Wet Combustion". When pressure is subcritical, water is "superheated vapor" and the process may be termed "Vapor Phase Wet Combustion".

I have discovered that the water vapor needed to promote combustion at relatively low temperature, as well as the water needed to limit the temperature, may advantageously have as its source the aqueous waste produced by a fuels conversion, whose apparatus and associated facilities consume energy produced by the combustion. In the course of performing these functions, combustible contaminants in the aqueous waste are burned, contributing their heating value and thereby purifying the water. The combustion apparatus, according to my invention, may be designed to accommodate additional aqueous waste produced at or near the site, for example, as a result of mining the raw fuel.

Since water typically comprises 85–98 percent of the aqueous waste from a fuels conversion, its recovery in liquid state represents a substantial energy saving compared with incineration or other forms of atmospheric combustion which necessarily discharge water in the vapor state.

FIGS. 1 and 2 diagram combustion embodiments in which fuel particles burn while entrained in a gaseous phase, a satisfactorily high inlet zone temperature being obtained by a combustion products recycle. Other embodiments may utilize fluidized beds, either of "bubbling" or circulating type. In the latter case, the heat content of recirculated solids is relied upon to achieve the desired inlet zone temperature.

FIG. 1 of application Ser. No. 813,486 (U.S. Pat. No. 4,714,032) diagrams an embodiment utilizing the heat transfer method of reactor temperature control ("heat transfer embodiments"). The embodiments of FIG. 5 of Patent A and FIG. 6 of Patent B also rely on this method. The "by-product" of low pressure steam or process heat is generally useful for space heating and other miscellaneous site heating requirements.

The embodiments of FIGS. 1 and 2 of this application and FIGS. 1 and 2 of the parent case, as well as FIG. 1 of Patent A and FIGS. 1 and 2 of Patent B rely, on the other hand, on the injection of water (or aqueous waste) to control combustion temperature ("water injection embodiments"). With the latter method, generation of high pressure steam requires relatively high operating pressure, in some cases above the critical pressure. Lower steam pressures permit subcritical operating pressures.

As described in the parent case, application Ser. No. 813,486 (U.S. Pat. No. 4,714,032) and in Cols. 28 and 29 of Patent B, the internal water distillation cycle can be utilized to purify extraneous water. Any water of poor quality is merely substituted for that which would have been recycled internally (utilizing appropriate heat exchange for economy).

I have discovered that the referenced embodiments may advantageously be combined with a fuels conversion, purifying its aqueous waste with high thermal efficiency and recovering its dry heating value while simultaneously supplying the conversion, and its associated facilities, with thermal and/or electrical energy. Heat may also be supplied to a fuels conversion by means of indirect heat exchange with steam or hot flue gas produced according to my combustion inventions.

A further unique advantage may be realized, in the case of pressurized conversions, by transferring heat by direct contact with materials being processed. It is usually possible to design the combustion apparatus for a pressure conveniently higher than that of the conversion, so that a heating medium, such as hot flue gas or flue gas-steam mixture, can flow to it without mechanical assistance. Washed flue gas may be supplied, as from the valve 184 and the line 185, of FIG. 1 or through the valve 171a of FIG. 1 of the parent case. Alternatively, washed flue gas-steam mixture may be supplied, as through the valve 256 and the line 257 of FIG. 2.

A simpler alternative is available for direct heating where a small input of fine ash is acceptable, as may be the case with certain coking and gasification processes. Hot gaseous combustion products can be diverted, as from the valve 141 and the line 142 of FIG. 1, from the line 233 of FIG. 2, from the line 132, through the valve 132a of the parent case, or from the line 132 of FIG. 1 of application Ser. No. 813,486 (U.S. Pat. No. 4,714,032). In all such cases, the extent of diversion is limited to the amount of hot fluid in excess of that necessary to supply the turbo-compressor(s) and would detract proportionately from the net production of energy in the form of steam and/or electricity.

In some cases, the supplemental fuel may itself be a waste product of sufficient heating value.

In addition to its role in promoting oxidation of combustible materials, alkali is added, in the case of a sulfur-containing fuel, for the purpose of neutralizing sulfuric acid to which it is converted. Wastes may contain compounds of other elements, such as phosphorus and the halogens, which can oxidize, under the combustion conditions, to corresponding inorganic acids, which could corrode the equipment. It is usually advisable, therefore, to add a common alkali, such as sodium or calcium carbonate or hydroxide, to most aqueous wastes, even when sulfur oxide emission regulations would not so require, to insure the maintainenance of a neutral or alkaline pH.

The first water to condense from combustion products is contaminated with non-combustible components of the aqueous waste and supplemental fuel, and spent and excess alkali added thereto. They may be conveniently separated in concentrated form and removed from the apparatus for disposal. In boiler embodiments, the balance of the product vapor is then condensed to a relatively pure water suitable, after separation of dissolved gases, for most industrial purposes, or plant effluent. (In gas turbine embodiments, the corresponding water is discharged in vapor form with flue gas but is subject to partial recovery therefrom by known methods.)

When charging a relatively high heating value waste water-fuel slurry to a water injection boiler embodiment, the pressure of steam exported may be of considerable importance, influencing the choice of combustion pressure. Also, when utilizing the feature of direct contact heat transfer between combustion and conversion, pressure needs to be high enough to move the heating medium to its point of application.

An example of the destruction of waste by combustion with a supplemental fuel is described in U.S. Pat. No. 3,858,534 (Berg). Fuel oil is the primary fuel and solid garbage and refuse (GAR) (current nomenclature: Municipal Solid Waste or MSW) the secondary fuel charged to a high temperature, slagging atmospheric combustion. Heat in combustion gases generates steam which is converted to electricity by "conventional components of a steam-powered electricity generating installation". An expensive atmospheric scrubbing system is specified for removal of suspended particles from the exhaust, entailing a pair of large settling and cooling ponds. The latent heat of water in the MSW is not recovered.

The water content of MSW is variable. A typical water: combustible ratio might be 0.5:1. The water:combustible ratio of a typical fuels conversion aqueous waste is about 10:1 or roughly 20 times higher.

If, instead of MSW, aqueous waste from a fuels conversion were to be charged, with the supplemental fuel oil, to Berg's combustion, the relative proportion of fuel oil would have to be increased to evaporate and heat to about 3000 degrees the greatly increased amount of water (some 10-20 times) in the waste. The latent heat of evaporation of this water (more than 1000 Btu/Lb) would be lost. The flue gas would have to be scrubbed, or otherwise processed for removal of particulates and other pollutants. It would be impossible to transfer heat by means of of hot combustion gases at atmospheric pressure to a pressurized conversion.

As previously noted, with my invention it is possible to transfer sensible heat directly from hot pressurized combustion (flue) gases, either hot as produced or after washing and reheating, to a fuel being converted. U.S. Pat. No. 3,859,933 (Von Klenck) describes a combination of waste carbonization and combustion. The carbonization produces a fuel (not to be confused with "flue") gas which is washed at essentially atmospheric pressure and (without reheating) burned as fuel to produce heat which is indirectly transferred to the materials being carbonized.

My method of burning carbonaceous material from aqueous wastes differs from Wet Air Oxidation (WAO) in that it utilizes higher temperatures and, preferably, lower pressures. At the higher temperatures, oxidation is several orders of magnitude faster and, therefore, much smaller reactors are required. Any surplus of heat is at a more valuable level. Lower pressures translate into lighter and less expensive equipment.

Another disadvantage of WAO is that both gaseous and liquid phases are present during the reaction, imposing an added resistance to rapid and complete conversion. Supercritical Water Oxidation (SCWO) avoids the latter difficulty by carrying out the reaction in a homogeneous dense phase. Subcritical embodiments of my invention enjoy a comparable advantage, the reaction medium being an essentially homogeneous vapor phase, as well as similarly rapid conversion, while normally employing much lower and more economical pressures (as, for example, 100-500 psi).

Having described my invention, I claim:

1. A combination of a fuels conversion process which consumes energy and produces an aqueous waste containing combustible contaminants, and a continuous pressurized combustion process comprising the steps of:

charging the waste and an excess of an oxygen-containing gas to a pressurized combustion zone, maintained at a temperature above the critical temperature of water;

providing time in the combustion zone for essentially complete oxidation of the contaminants to carbon dioxide and water vapor, with the evolution of their heats of combustion;

cooling the gaseous products of combustion at essentially combustion pressure by indirect transfer of heat therefrom, substantially condensing the water vapor contained therein, forming a washed flue gas;

discharging the condensed water essentially free of combustible contaminants;

utilizing the net production of transferred heat to generate steam as an energy carrier, at least a portion of which is consumed by the fuels conversion.

2. A combination as in claim 1 in which supplemental fuel and additional oxygen-containing gas are also charged to the combustion zone, increasing the heat evolution such that the net steam generation becomes sufficient to supply all of the energy required in that form by the fuels conversion and its supporting facilities.

3. A combination as in claim 2 in which at least a portion of the aqueous waste serves as a medium for slurrying and charging the supplemental fuel.

4. A combination as in claim 2 in which an alkali is added with the supplemental fuel in an amount at least the chemical equivalent of the sulfur in the fuel and waste as alkali sulfate.

5. A combination as in claim 2 in which the supplemental fuel is a waste product having a heating value higher than that of the aqueous waste.

6. A combination as in claim 2 in which the temperature of the combustion is limited to a predetermined maximum by injecting at least a portion of the aqueous waste into the combustion zone.

7. A combination as in claim 2 in which some of the net production of heat from the combustion is transferred to the fuels conversion in the form of sensible heat, by direct contact between uncooled gaseous combustion products and the fuel being converted.

8. A combination as in claim 2 in which some of the net production of heat is transferred from the combustion to the fuels conversion in the form of sensible heat, by direct contact between washed flue gas, which has been reheated by indirect exchange with uncooled gaseous combustion products, and the fuel being converted.

9. A combination as in claim 2 in which a portion of the net production of steam is conventionally converted to electricity of which at least a portion is utilized to satisfy requirements for energy in that form of the fuels conversion and supporting facilities.

10. A combination as in claim 2 in which the step of cooling the gaseous products of combustion at essentially combustion pressure is carried only to a temperature slightly below their dewpoint, followed by the steps of:

separating therefrom an aqueous condensate, containing entrained particulate matter, forming a washed flue gas-steam mixture;
reheating the washed flue gas-steam mixture to an approach to combustion temperature by indirect exchange with uncooled gaseous combustion products;
expanding the reheated flue gas-steam mixture through at least one stage of turbines which produce mechanical energy;
Utilizing a portion of the mechanical energy to pressurize the oxygen-containing gas;
converting the surplus mechanical energy into electricity;
utilizing electricity so produced to at least partially satisfy the requirements for energy in that form of the fuels conversion and its supporting facilities.

11. A combination of a continuous industrial process which consumes energy and produces a combustible waste, and a continuous pressurized combustion process comprising the steps of:

charging the waste and an excess of an oxygen-containing gas to a pressurized combustion zone, maintained at a temperature above the critical temperature of water;
providing time in the combustion zone for essentially complete oxidation of the waste to carbon dioxide and water vapor, with the evolution of their heats of combustion;
cooling the gaseous products of combustion at essentially combustion pressure by indirect transfer of heat therefrom, substantially condensing the water vapor contained therein, forming a washed flue gas;
discharging the condensed water essentially free of combustible contaminants;
utilizing the net production of transferred heat to generate steam as an energy carrier, at least a portion of which is consumed by the industrial process.

12. A combination as in claim 11 in which the waste is in aqueous form.

13. A combination as in claim 11 in which a supplemental fuel and additional oxygen-containing gas are also charged to the combustion zone, increasing the heat evolution such that the net steam generation becomes sufficient to supply all of the energy required in that form by the industrial process and its supporting facilities.

14. A combination as in claim 13 in which an alkali is added to the supplemental fuel in an amount at least sufficient to neutralize inorganic acids produced from anions contained in the fuel and waste.

15. A combination as in claim 13 in which the supplemental fuel is a waste product having a heating value higher than the waste produced by the industrial process.

16. A combination as in claim 13 in which some of the net production of heat from the combustion is transferred to the industrial process in the form of sensible heat, by direct contact between uncooled combustion products and material being processed.

17. A combination as in claim 13 in which some of the net production of heat from the combustion is transferred to the industrial process in the form of sensible heat, by direct contact between washed flue gas, which has been reheated by indirect exchange with uncooled gaseous combustion products, and material being processed.

18. A combination as in claim 13 in which at least a portion of the aqueous waste serves as a medium for slurrying and charging the supplemental fuel.

19. A combination as in claim 13 in which the temperature of the combustion is limited to a predetermined maximum by injecting at least a portion of the aqueous waste into the combustion zone.

20. A combination as in claim 13 in which a portion of the net production of steam is conventionally converted to electricity which is used to at least partially satisfy the requirements for energy in that form of the industrial process and its supporting facilities.

21. A combination as in claim 13 in which the step of cooling the gaseous products of combustion at essentially combustion pressure is carried only to a temperature slightly below their dewpoint, followed by the steps of:

separating therefrom an aqueous condensate, containing entrained particulate matter, forming a washed flue gas-steam mixture;
reheating the washed flue gas-steam mixture to an approach to combustion temperature by indirect exchange with uncooled gaseous combustion products;

expanding the reheated flue gas-steam mixture through at least one stage of turbines which produce mechanical energy;

Utilizing a portion of the mechanical energy to pressurize the oxygen-containing gas;

converting the surplus mechanical energy into electricity;

utilizing electricity so produced to at least partially satisfy the requirements for energy in that form of the industrial process and its supporting facilities.

22. A combination of a waste treatment process which consumes energy and produces an aqueous waste containing combustible contaminants and a pressurized wet combustion comprising the steps of:

charging the aqueous waste and an excess of an oxygen-containing gas to a pressurized combustion zone, maintained at a temperature above the critical temperature of water;

providing time in the combustion zone for essentially complete oxidation of the contaminants to carbon dioxide and water vapor, with the evolution of their heats of combustion;

cooling the gaseous products of combustion at essentially combustion pressure by indirect transfer of heat therefrom, substantially condensing the water vapor contained therein, forming a washed flue gas;

discharging the condensed water essentially free of combustible contaminants;

utilizing the net production of transferred heat to generate steam as an energy carrier, at least a portion of which is consumed by the waste treatment and its supporting facilities.

* * * * *